(No Model.)

C. L. HEALY.
TRANSMITTER FOR PRINTING TELEGRAPHS.

No. 341,654.                    Patented May 11, 1886.

ATTEST:
E. C. Rowland
A. W. Riddle

INVENTOR:
Clarence L. Healy
By Dyer Seely
Attys

UNITED STATES PATENT OFFICE.

CLARENCE L. HEALY, OF BROOKLYN, ASSIGNOR TO THE COMMERCIAL TELEGRAM COMPANY, OF NEW YORK, N. Y.

TRANSMITTER FOR PRINTING-TELEGRAPHS.

SPECIFICATION forming part of Letters Patent No. 341,654, dated May 11, 1886.

Application filed February 9, 1886. Serial No. 191,278. (No model.)

*To all whom it may concern:*

Be it known that I, CLARENCE L. HEALY, of Brooklyn, in the county of Kings and State of New York, have invented a certain new and useful Improvement in Transmitters for Printing-Telegraphs, of which the following is a specification.

The object I have in view is to produce a stopping and starting mechanism for printing-telegraph transmitters which will be much quicker and more positive in action than those heretofore employed. Such transmitters have a toothed wheel, with which engages an armature-lever, which is drawn forward into engagement with such wheel to stop the transmitter by an electro-magnet, which is in the operating-circuit including also the key-board and "sunflower."

Heretofore the armature lever was disengaged by a retracting-spring. By my invention a second electro-magnet retracts the armature-lever. This second or releasing magnet is wound differentially with two sets of opposing coils, one set in the operating-circuit with the coils of the locking-magnet, and the other set in a constantly-closed local circuit. These two sets of coils neutralize each other when the locking-magnet is energized, and the armature is drawn forward by such locking-magnet quickly and positively, no opposing force being present; but when locking-magnet circuit is opened the current is withdrawn from one set of coils of releasing-magnet, and such releasing-magnet then acts without opposition to retract armature, and this movement is effected more rapidly and positively than it would be by a retracting-spring.

It is evident that instead of a constant local circuit to energize releasing-magnet when operating-circuit is opened a permanent magnet might be used for the purpose.

Figure 1:
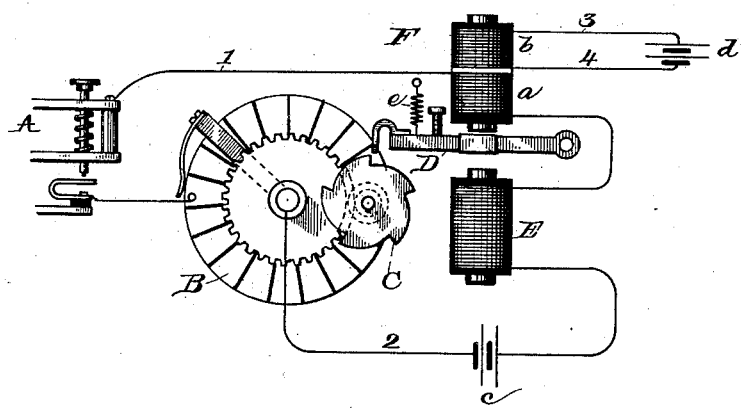
Figure 2:
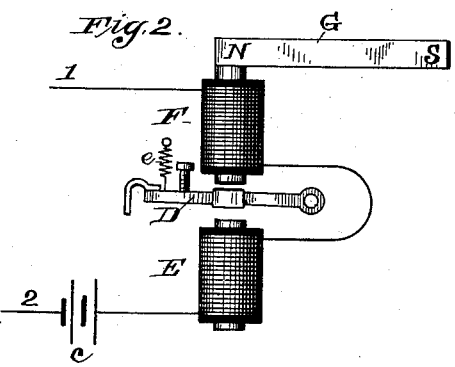

In the accompanying drawings, forming a part hereof, Figure 1 is a view principally in diagram of apparatus embodying the invention, and Fig. 2 shows a modified form of the apparatus.

With reference more particularly to Fig. 1, A is the key-board, B the sunflower, and C the stopping-wheel, of a well-understood type of transmitter for printing-telegraphs. D is an armature-lever, which is thrown into engagement with teeth of wheel C to stop the movement of transmitter. E is the locking electro-magnet, and F is the releasing electro-magnet. Magnet F has two sets of opposing coils, *a b*. Coils *a* are in the transmitter-operating circuit 1 2, which includes the coils of magnet E, the key-board, and sunflower, and is supplied with current from a battery, *c*, or other source of electrical energy. The reverse coils *b* are in the local circuit 3 4, supplied by battery *d*, or other source of electrical energy. A light spring, *e*, balances weight of armature, but may be omitted, it not being essential to the operation.

Normally circuit 1 2 is open, magnet E is demagnetized, magnet F is energized from battery *d* by coils *b*, and armature-lever D is retracted. When circuit 1 2 is closed, coils *a* neutralize coils *b*, demagnetizing F, and magnet E is energized, drawing D forward and locking wheel C. The opening of circuit 1 2 causes E to be demagnetized and F to be again energized, retracting D and releasing wheel C.

Instead of providing magnet F with reverse coils and a local circuit for one set of coils, as shown in Fig. 1, all the coils of magnet F may be in circuit 1 2, and a permanent magnet, G, be used to give the constant force for retracting armature D and releasing wheel C, as shown in Fig. 2.

What I claim is—

1. In a printing-telegraph transmitter, the combination, with the locking-magnet and armature-lever, of a releasing-magnet having coils in circuit with the locking-magnet, and a separate source of magnetic power acting to energize the releasing-magnet and neutralized when the circuit common to both magnets is closed, substantially as set forth.

2. In a printing-telegraph transmitter, the combination, with key-board, sunflower, and stopping-wheel, of a locking-magnet in the operating-circuit with the key-board and sunflower, a releasing-magnet having coils in said operating-circuit, and a separate source of magnetic power acting to energize the releasing-magnet opposite to the coils in operating-circuit, and neutralizing the action of such coils, substantially as set forth.

3. In a printing-telegraph transmitter, the combination, with the locking-magnet and armature-lever, of a releasing-magnet having coils in circuit with the locking-magnet and reverse coils in a local circuit, said releasing-magnet being neutralized when the circuit common to both magnets is closed, substantially as set forth.

4. In a printing-telegraph transmitter, the combination, with the locking-magnet and armature-lever, of a releasing-magnet having coils in circuit with the locking-magnet, a separate source of magnetic power acting to energize the releasing-magnet, and neutralized when the circuit common to both magnets is closed, and a spring balancing weight of locking armature, substantially as set forth.

This specification signed and witnessed this 23d day of January, 1886.

CLARENCE L. HEALY.

Witnesses:
W. B. HERBERT,
C. BLAUVELT.